United States Patent
Tsukada et al.

(10) Patent No.: US 9,083,913 B2
(45) Date of Patent: Jul. 14, 2015

(54) IMAGE PROCESSING METHOD, IMAGE PROCESSING DEVICE, AND PROGRAM

(75) Inventors: Masato Tsukada, Tokyo (JP); Johji Tajima, Aichi (JP)

(73) Assignee: NEC CORPORATION, Tokyo (JP)

( * ) Notice: Subject to any disclaimer, the term of this patent is extended or adjusted under 35 U.S.C. 154(b) by 468 days.

(21) Appl. No.: 13/391,170

(22) PCT Filed: Aug. 6, 2010

(86) PCT No.: PCT/JP2010/063391
§ 371 (c)(1),
(2), (4) Date: Feb. 17, 2012

(87) PCT Pub. No.: WO2011/021518
PCT Pub. Date: Feb. 24, 2011

(65) Prior Publication Data
US 2012/0155762 A1    Jun. 21, 2012

(30) Foreign Application Priority Data

Aug. 19, 2009    (JP) ................................ 2009-190248

(51) Int. Cl.
*G06T 5/00* (2006.01)
*H04N 1/409* (2006.01)

(52) U.S. Cl.
CPC .............. *H04N 1/4092* (2013.01); *G06T 5/004* (2013.01); *G06T 2207/20192* (2013.01)

(58) Field of Classification Search
None
See application file for complete search history.

(56) References Cited

U.S. PATENT DOCUMENTS

| 3,029,387 | A | * | 4/1962 | Moe .................................. 324/97 |
| 6,192,153 | B1 | | 2/2001 | Suzuki et al. |
| 2002/0136463 | A1 | | 9/2002 | Akahori et al. |
| 2003/0113032 | A1 | | 6/2003 | Wang et al. |
| 2007/0279696 | A1 | * | 12/2007 | Matsuzaka ................... 358/3.26 |
| 2009/0190851 | A1 | * | 7/2009 | Chien et al. ................... 382/255 |
| 2009/0196524 | A1 | * | 8/2009 | Godin ............................ 382/263 |
| 2010/0080487 | A1 | * | 4/2010 | Yitzhaky et al. .............. 382/266 |

FOREIGN PATENT DOCUMENTS

| CN | 1471690 | A | 1/2004 |
| CN | 1614992 | A | 5/2005 |
| CN | 101101669 | A | 1/2008 |
| EP | 1113390 | A2 | 7/2001 |
| EP | 1455304 | A2 | 9/2004 |
| JP | 9-135331 | A | 5/1997 |
| JP | 10-294862 | A | 11/1998 |
| JP | 2004-172704 | A | 11/1998 |
| JP | 11-284854 | A | 10/1999 |
| JP | 2001-053974 | A | 2/2001 |

(Continued)

OTHER PUBLICATIONS

Wang, Q.—"Contrast enhancement for enlarged images based on edge sharpening"—IEEE 2005, pp. 762-765.*
Orwig, C.—"Capture Sharpening in Adobe Photoshop Lightroom 2"—Feb. 3, 2009, pp. 1-2.*

(Continued)

*Primary Examiner* — Bernard Krasnic
(74) *Attorney, Agent, or Firm* — Sughrue Mion, PLLC

(57) ABSTRACT

Provided is an image processing method wherein an edge is detected from an image to which a sharpening process is to be applied, and on the basis of a length of the edge which is present near a pixel to which the sharpening process is to be applied, the strength of the sharpening process to the pixel is determined.

12 Claims, 5 Drawing Sheets

(56) References Cited

FOREIGN PATENT DOCUMENTS

| JP | 2003-101774 A | 4/2003 |
|---|---|---|
| JP | 2005-260908 A | 9/2005 |
| KR | 1020060081433 A | 7/2006 |

OTHER PUBLICATIONS

Communication dated Jan. 3, 2014, issued by the European Patent Office in corresponding Application No. 10809863.

J.A.C. Yule, "Color Reproduction Theory", Print Society Publication Department, 1971, 4 pages.

Office Action dated May 29, 2013; issued by the Korean Intellectual Property Office; in corresponding application No. 10-2012-7003990.

Office Action, dated May 21, 2014, issued by the Japanese Patent Office, in counterpart Application No. 2011-527636.

Search Report dated Mar. 10, 2014, issued by the State Intellectual Property Office of the People's Republic of China in corresponding Application No. 2010800368367.

* cited by examiner

| LINE SEGMENT NO. | LINE SEGMENT PIXEL NUMBER n | COORDINATE (i,j) OF PIXEL CONSTITUTING LINE SEGMENT | | | | | | | | | |
|---|---|---|---|---|---|---|---|---|---|---|---|
| 1 | 3 | 4 | 5 | 5 | 5 | 6 | 5 | | | | |
| 2 | 5 | 10 | 12 | 11 | 12 | 12 | 13 | 13 | 13 | 14 | 14 |
| 3 | 5 | 2 | 4 | 2 | 5 | 2 | 6 | 2 | 7 | 2 | 8 |
| 4 | 4 | 3 | 8 | 4 | 9 | 5 | 9 | 6 | 10 | | |

FIG. 5

IMAGE PROCESSING METHOD, IMAGE PROCESSING DEVICE, AND PROGRAM

CROSS REFERENCE TO RELATED APPLICATIONS

This application is a National Stage of International Application No. PCT/JP2010/063391 filed Aug. 6, 2010, claiming priority based on Japanese Patent Application No. 2009-190248, filed Aug. 19, 2009, the contents of all of which are incorporated herein by reference in their entirety.

TECHNICAL FIELD

The present invention relates to an image processing method, an image processing device, and a program therefor.

BACKGROUND ART

In recent years, prevalence of computers and digital cameras has enabled anybody to photograph/print pictures with ease. For this reason, it is not rare for an individual to handle a large volume of images. In such a circumstance, the sufficient quality is not always obtained for the photographed images, depending upon photographing conditions at that moment. Thus, the technology of automatically image-correcting a large volume of the images responding to respective contents and improving the image quality thereof is required.

The process of sharpening the images is often performed as one of the technologies of improving the image quality when the images photographed with digital camera, scanners or the like are displayed or printed. The technology that is called unsharp masking is widely employed as the sharpening technology (Non-patent literature 1). Upon assuming an image and an image obtained by blurring it to be f and $f_s$, respectively, an image g sharpened like Equation (1) is obtained.

$$g = f + \lambda(f - f_s) \quad (1)$$

Where $\lambda$ is a coefficient that is used at the moment of adding the part in which a space frequency of the image is high into an original image, namely, a coefficient for adjusting a strength of the sharpening, and the optimum value is employed for it as a result of making an trial for many images. For example, with the case of targeting artificial products such as buildings as scenes of the input images, a value that allows the strong sharpening to be added is preferably set for the coefficient for adjusting a strength of the sharpening, and on the other hand, a value that allows the weak sharpening to be added is preferably applied with the case of targeting natural products.

The method of adjusting parameters in the sharpening process according to image features in the images is also known. Patent literature 1 states that a thickness of an edge (an edge emphasizing scope) has to be adjusted responding to the features of the images when the sharpness is emphasized for the digital images by executing the edge emphasis. And, as its adjusting method, the method is described of, when the edge exists near an objective pixel, adjusting the edge emphasis by changing an emphasis radius and a weight matrix with respect to a positional relation between the thickness of the above edge and the objective pixel.

CITATION LIST

Patent Literature

PTL 1: JP-P2001-53974A

Non-Patent Literature

NPL 1: Color Reproduction Theory written by J. A. C. Yule, Print society Publication Department, 1971.

SUMMARY OF INVENTION

Technical Problem

In the background arts, it is specified that the optimum value for the coefficient for adjusting a strength of the sharpening differs, depending upon the scene of the input signal, and it is described that for example, the strong sharpening is set when the artificial product is employed for the scene of the input signal, and the weak sharpening is set with the case of the natural product.

However, the above situation is not always true. For example, out of the natural products like plants, the natural product like the artificial product, which is configured of beautiful straight lines and curves, also exists. For such images of the scenes, a process similar to the process that is performed for the artificial products is preferably processed in many cases. For this, it should be thought that it is not that the optimum process exit for the natural product and the artificial product, respectively, but that information for performing the optimum process for each part of the image exists.

Further, as a method of emphasizing the sharpness for the part of the image, the method of paying an attention to a positional relation between the thickness of the edge and the objective pixel, and adjusting the edge strength responding to these features is described in the Patent literature 1.

However, only the thickness and the position of the edge cannot cope with the optimum edge emphasis for the arbitrary input images sufficiently. For example, applying the emphasizing technique of the sharpness in accordance with the Patent literature 1 to the images including such a region in which the short edges mass causes the sharpness to become excessive, and incurs a decline in the image quality.

Thereupon, the present invention has been accomplished in consideration of the above-mentioned problems, and an object thereof is to provide an image processing device, an image processing method, and an image processing program that improve the image quality of the image by optimizing the sharpness in the part of the image without relying upon attributes of subjects such as the natural product and the artificial product within the image.

Solution to Problem

The present invention is an image processing method of detecting an edge from an image to which a sharpening process is to be applied, and based upon a length of said edge existing near a target pixel of the sharpening process, deciding a strength of the sharpening process in said target pixel.

The present invention is an image processing device comprising: an image sharpening strength decision unit that detects an edge from an image to which a sharpening process is to be applied, and based upon a length of said edge existing near a target pixel of the sharpening process, decides a strength of the sharpening process in said target pixel; and a sharpening processing unit that performs sharpening of said image based upon said strength of the sharpening process.

The present invention is a program for causing an information processing device to execute: an image sharpening strength decision process of detecting an edge from an image to which a sharpening process is to be applied, and based upon a length of said edge existing near a target pixel of the sharpening process, deciding a strength of the sharpening process in said target pixel; and a sharpening process of performing sharpening of said image based upon said strength decided by the image sharpening strength decision process.

Advantageous Effect of Invention

The present invention makes it possible to improve the image quality of the image by optimizing the sharpness in the part of the image without relying upon attributes of subjects such as the natural product and the artificial product within the image.

BRIEF DESCRIPTION OF DRAWINGS

FIG. 5 is a view for explaining the first exemplary embodiment.

DESCRIPTION OF EMBODIMENTS

The exemplary embodiments of the present invention will be explained.

First Exemplary Embodiment

Figure 1:
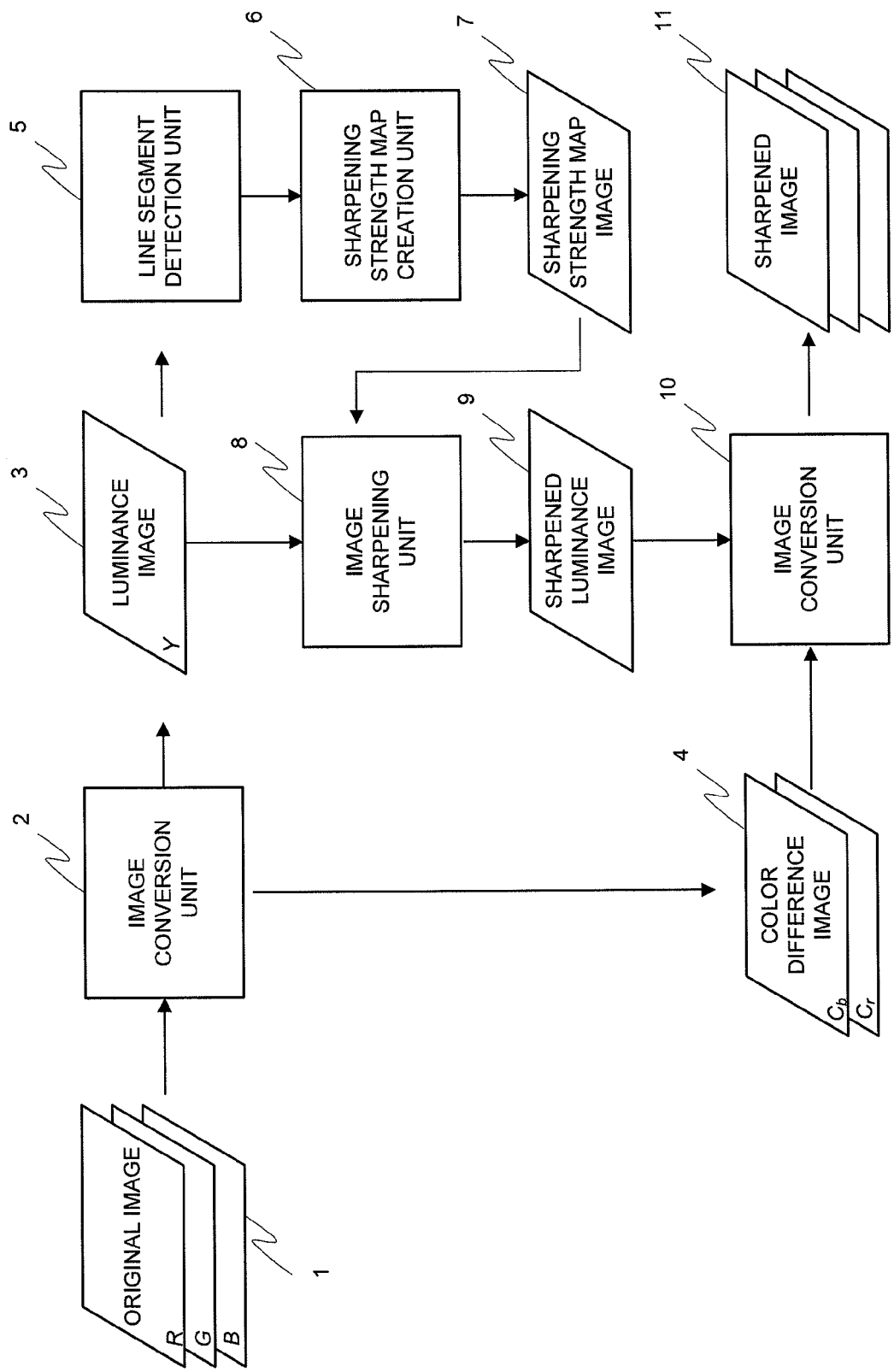
FIG. 1 is a block diagram illustrating a first exemplary embodiment of the present invention.
Figure 2:
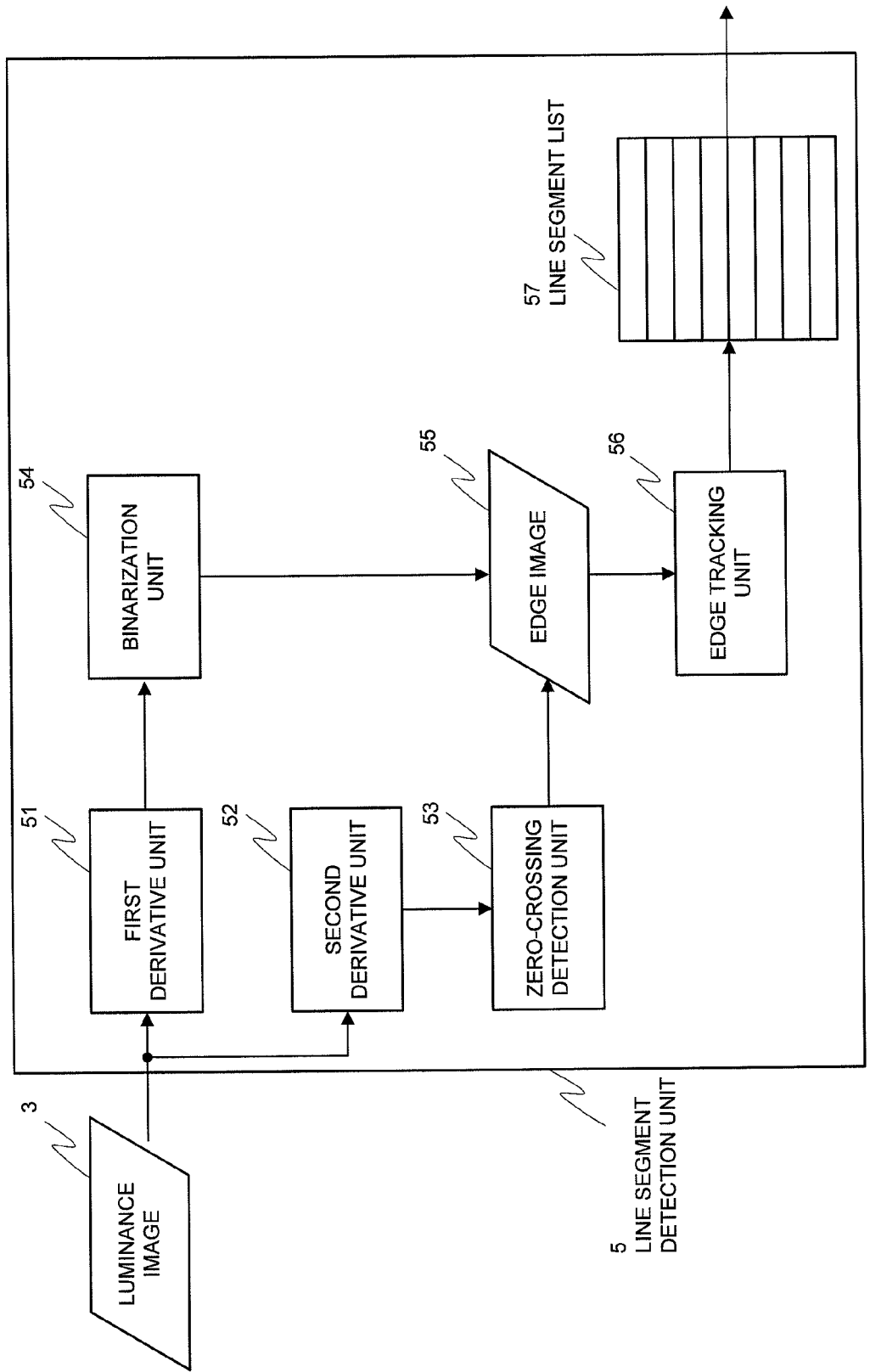
FIG. 2 is a block diagram illustrating a line segment detection unit of the first exemplary embodiment.

The first exemplary embodiment will be explained. The first exemplary embodiment of the present invention will be explained by making a reference to FIG. 1 and FIG. 2. FIG. 1 is a block diagram illustrating the first exemplary embodiment of the present invention. FIG. 2 is a block diagram illustrating the line segment detection unit of the present invention.

An original image 1 is normally configured of images of three components of R (red), G (green), and B (blue), and an image conversion unit 2 converts the original image 1 into an luminance image 3 and a color difference image 4. The sharpening process after it is applied to the luminance image 3. For example, according to Equation (2), RGB that is obtained from the original image 1 is converted into three components of Y constituting the luminance image 3, $C_b$ and $C_r$ each constituting the color difference image 4. In this case, the luminance image 3 that is configured of a Y component is sharpened; however, a conversion from RGB to CIELAB color space is made, and a brightness image that is configured of its L* component may be regarded as the luminance image 3 and be sharpened. Further, with regard to the luminance component and the brightness component, not only the above-mentioned $YC_bC_r$ and color space CIELAB but also the color space such as YUV and HSV may be utilized. Further, with the case that the original image is a single-color image, only the luminance image is sharpened because no color difference component exists.

$$\begin{cases} Y = 0.2990R + 0.5870G + 0.1140B \\ C_b = -0.16887R - 0.3313G + 0.5000B \\ C_r = 0.5000R - 0.4187G - 0.0813B \end{cases} \quad (2)$$

A line segment detection unit 5 extracts the edges within the luminance image 3. A specific example of the line segment detection unit 5 will be explained by making a reference FIG. 2. A first derivative unit 51 and a second derivative unit 52 act on the luminance image 3. A zero-crossing detection unit 53 is caused to act on an output of the second derivative unit 52. Further, a binarization unit 54 is caused to act on an output of the first derivative unit 51. The output of the zero-crossing detection unit 53 is a one-pixel wide edge image; however much nose is simultaneously detected therefrom. The output of the binarization unit 54 is an edge region with a wide width. Combining these two makes it possible to obtain a one-pixel wide edge image 55 having less noise. For these details, for example, "Computer Image Processing" written by Tamura Hideyuki, pp. 182-197, 2002, Ohmsha, Ltd. can be referenced.

As a method of extracting the edge from the image, many methods such as a Canny edge detection algorithm ("Digital Image Processing", 2004, pp. 209-210, Computer Graphic Arts Society (CG-ARTS Society) are conventionally known, so these can be also applied.

An edge tracking unit 56 tracks the edge detected in the edge image 55, and files the part to which a straight line can be applied as a line segment into a line segment list 57. An example of the content of the line segment list 57 is shown in FIG. 3.

Figures 3, 4:
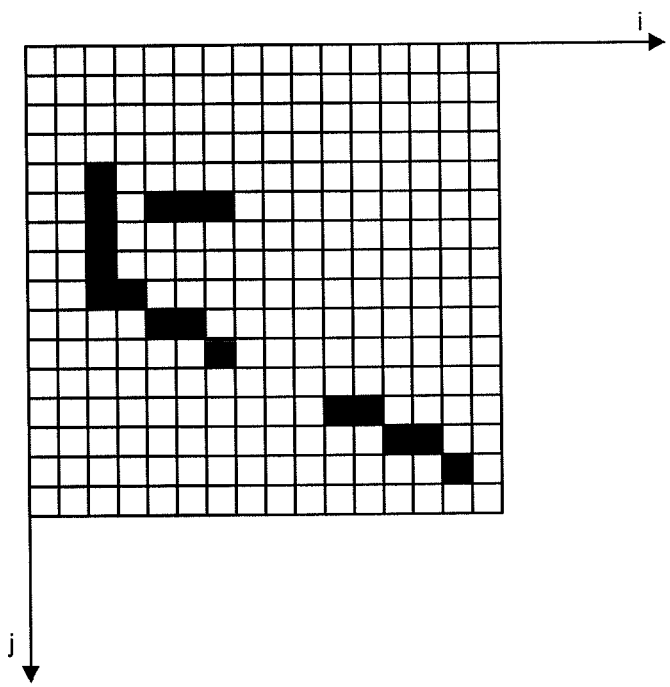
FIG. 3 is a view illustrating an example of contents that are filed into a line segment list.
FIG. 4 is a view for explaining the first exemplary embodiment.

FIG. 3 shows an example of the line segment list 57 into which four line segments have been written. For example, it shows that a third-place line segment is a five-pixel long line segment that is comprised of five pixels of (2, 4), (2, 5), (2, 6), (2, 7), and (2, 8).

FIG. 4 is a view for showing these detected four line segments as a pixel unit. Additionally, herein, it is assumed that the left and top coordinate is (0, 0).

Straight line fitting can be executed by, for example, obtaining a straight line that allows a square sum of distances to be minimized with respect to n tracked pixels $(x_i, y_i)$ $(i=1, 2, \ldots, n)$, and assuming that the line segment has been fitted when the maximum value of the distance from the above straight line to each pixel is smaller than a pre-decided threshold.

A sharpening strength map creation unit 6 creates a sharpening strength map image 7. Firstly, the sharpening strength map creation unit 6 writes a sharpening strength $\lambda_0$ that is applied to an entirety of the image into each pixel of the sharpening strength map image 7. Secondly, the sharpening strength map creation unit 6 investigates a length of each line segment created in the line segment list 57 of the line segment detection unit 5, and to begin with, with regard to the line segments of which a length l is equal to or more than a threshold $l_{th}$, writes a sharpening strength $\lambda_1$ for giving a strong sharpness into $l_n$ pixels existing near the above line segments of the sharpening strength map image 7. That is, the sharpening strength map creation unit 6 forms the sharpening strength map image 7 such that the edges near the edge line segments of which the length l is equal to or more than the threshold $l_{th}$ are emphasized more strongly. And, finally, with regard to the line segments created in the line segment list 57 of the line segment detection unit 5 of which the length l is less than the threshold $l_{th}$, the sharpening strength map creation unit 6 writes a weak sharpening strength $\lambda_2$ into $l_n$ pixels near the above line segments of the sharpening strength map image 7 likewise. Herein, when $\lambda_1$ has been already written into the pixel, the sharpening strength map creation unit 6 overwrites the weak sharpening strength $\lambda_2$ into a position of the above pixel.

Additionally, the above-mentioned threshold $l_{th}$ and $l_n$ are constant, respectively, that depend upon the conditions under which the above images are observed, and are decided with an experiment. For example, with the case of printing the image at 12 pixels/mm, a value of 20 to 30 pixels is appropriate as the threshold $l_{th}$, and at this moment, a good result is often obtained when $l_n$ is set to 10 pixels or so; however, this is not always true. That is, it is desirable to decide the optimum threshold by making the experiment because these thresholds are only yardsticks.

Herein, the above-mentioned process aims for applying the sharpening to the linear edge part. That is, the similar process is desirably applied to not only the strictly straight line but also the curve having an arc. When, even though the curve having not the strictly straight line but the arc is divided into a plurality of the line segments with the above-mentioned process, the line segments have been linked, the line segments are regarded as one line segment by employing the above linkability, or the threshold $l_{th}$ is decided in such a manner that the length of the above divided line segments satisfies the condition of the threshold $l_{th}$. While the width $l_n$ of the adjacency in which the sharpening is performed, and the sharpening strength $\lambda_1$ are given as constants, it is also possible to enhance these constants, for example, by adaptively changing them with a linear function or a non-linear function associated with the length of the related line segment.

Further, the sharpening strengths $\lambda_0$, $\lambda_1$, and $\lambda_2$ are constants that depend upon the technique of the sharpening. In many cases, it does not matter that the sharpening strengths $\lambda_2$ to be applied to the image region having short edge line segments that is often observed in the natural product or the like is placed equally to the sharpening strength $\lambda_0$ that is applied to an entirety of the image. In that case, one example of a relation of $\lambda_0$, $\lambda_1$, and $\lambda_2$ behaves like Equation (3).

$$\lambda_0 = \lambda_2 < \lambda_1 \tag{3}$$

Additionally, a magnitude relation of $\lambda_0$ and $\lambda_2$ is not limited to the Equation (3), and it is enough that they are smaller than $\lambda_1$.

With regard to decision of parameters of the sharpening strength in the target pixel within the image and the width $l_n$ of the adjacency, selecting parameters based upon the length of the shorter edge makes it possible to suppress deficiency such as the sharpness of the image being too high when a plurality of the edges exist adjacently.

Figure 5:
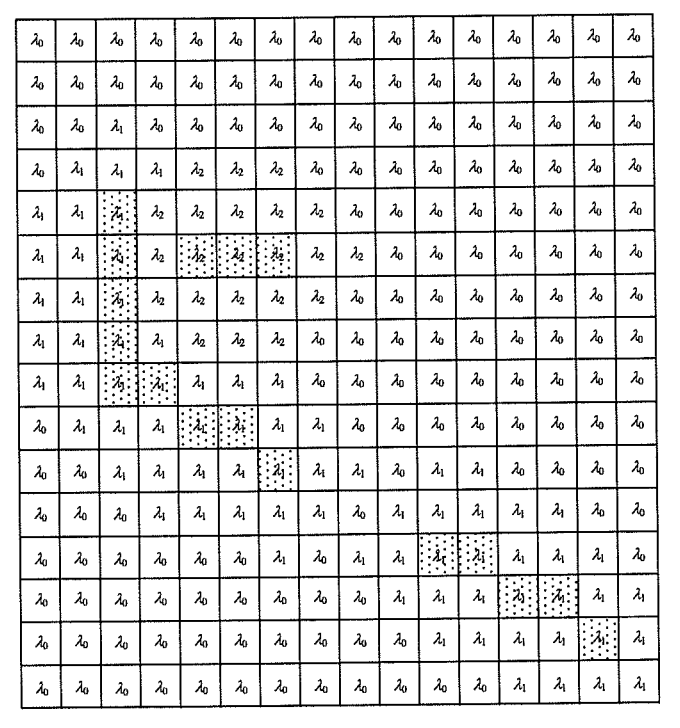

FIG. 5 shows the sharpening strengths written into the sharpening strength map image 7 as a result of executing the above process for the line segment images of FIG. 4 with $l_{th}=4$ and $l_n=2$ set as an example, respectively. In the same figure, the pixels forming the line segments are hatched and shown, $\lambda_2$ is written into the pixels existing within the distance $l_n$ from the line segment with a line segment number 1, of which the length is less than $l_{th}$, $\lambda_1$ is written into the pixels that exist within the distance $l_n$ from the line segments with a line segment number 2, a line segment number 3, and a line segment number 4 and yet do not exist within the distance $l_n$ from the line segment with a line segment number 1, and the strength of $\lambda_0$ is written into the residual pixels.

An image sharpening unit 8 performs the sharpening for each pixel of the luminance image 3 by making a reference to the sharpening strength map image 7, for example, in such a manner of Equation (4).

$$Y'(i,j) = Y(i,j) + \lambda(i,j) \times \{Y(i,j) - \Sigma_{k,l} Y(i-k, j-l) g(k,l)\} \tag{4}$$

Where Y (i, j) is a pixel value in a position (i, j) of the luminance image 3, $\lambda_2$ (i, j) is a pixel value (=sharpening strength) in a position (i, j) of the sharpening strength map image 7, and Y'(i, j) is a pixel value in a position (i, j) of a sharpened luminance image 9 that is obtained as a result of performing the sharpness process. g(k, l) is a Kernel function of convolution for the luminance image Y, and a Gaussian function or the like is employed for it. An term within { } of the Equation (4), which becomes a component having a high space frequency of the luminance image 3, is equivalent to (f−fs) of the Equation (1). Adding this to the original luminance image Y allows the sharpening of the luminance image 3 to be performed. $\lambda(i, j)$ is a parameter for controlling an extent of its addition in a pixel unit, and the strong sharpening is performed in the pixel position of $\lambda_2$ (i, j)=$\lambda_1$ and the weak sharpening is performed in the pixel position of $\lambda(i, j)$=$\lambda_0$ or $\lambda(i, j)$=$\lambda_2$.

As a result of computation of the Equation (4), the sharpened luminance image 9 to which the sharpening suitable for each part of the image has been applied is obtained. Additionally, while the sharpening by the unsharp masking of the Equation (1) is adopted in this example, the other sharpening such as a DOG (Difference of Gaussian) filter that is conventionally employed as an term within { } can be also utilized.

An image conversion unit 10 creates sharpened images 11 expressed for each pixel with R, G, and B from the sharpened luminance image 9 subjected to the sharpness process and the color difference image 4 according to Equation (5).

$$\begin{cases} R' = Y' + 1.4020 C_r \\ G' = Y' - 0.3441 C_b - 0.7141 C_r \\ B' = Y' + 1.7720 C_b \end{cases} \tag{5}$$

The configuration mentioned above allows a result of having applied the sharpening having an appropriate strength to the original image 1 responding to the content of the image to be obtained in the sharpened image 11.

Second Exemplary Embodiment

The second exemplary embodiment of the present invention will be explained.

Figure 6:
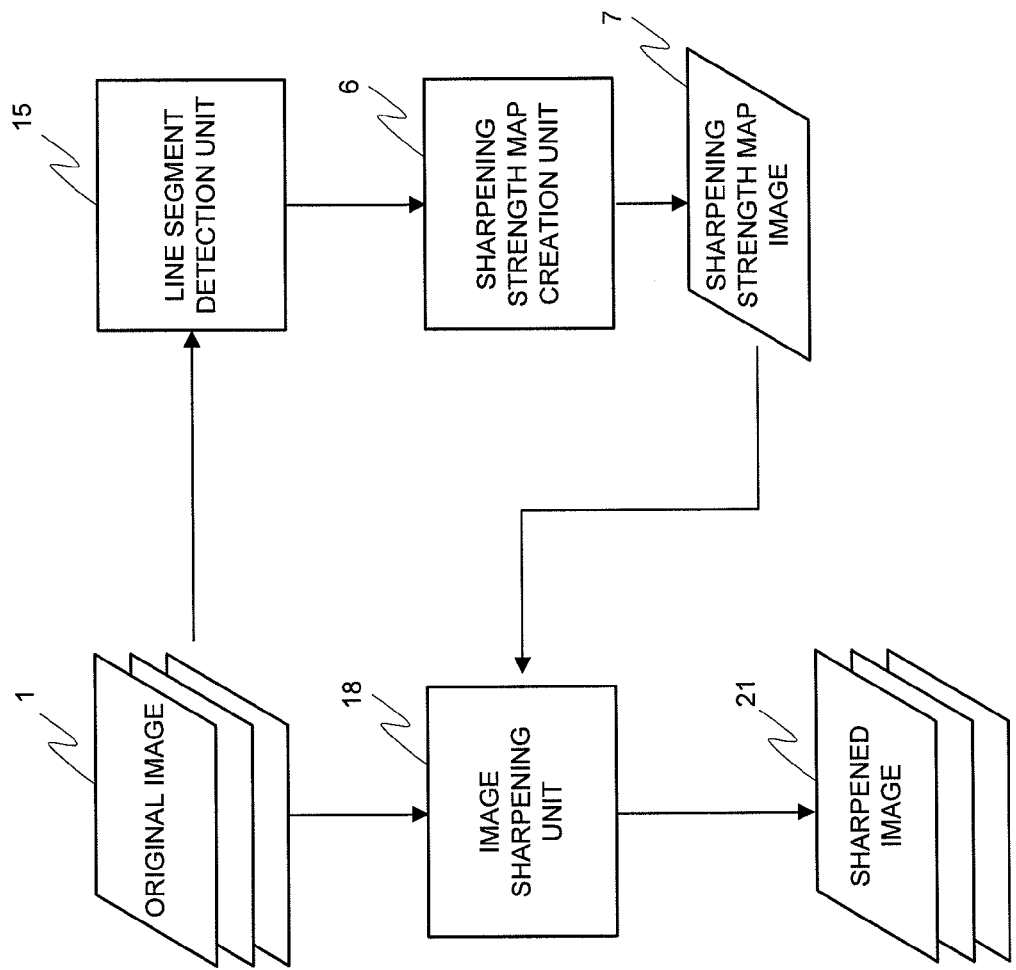
FIG. 6 is a block diagram illustrating a second exemplary embodiment of the present invention.

FIG. 6 is a view illustrating a configuration of the image processing device, being a second example of the present invention.

While the original image was converted into the luminance image and the color difference image, and the sharpening was performed only for the luminance image in the first exemplary embodiment of the present invention, the image processing device, being the second exemplary embodiment, applies the sharpening to the RGB image because the almost same effect is obtained even though the sharpening is applied for each of the R component, the G component and the B component. Herein, a line segment detection unit 15 is configured to separately handle three components of R, G, and B of the original image 1, is configured to include the above-described line segment detection units 5 threefold, or is configured so that the line segment detection unit 5 sequentially handles three components.

After the line segments have been obtained in the line segment list 57, the sharpening strength map image 7 is obtained by the sharpening strength map creation unit 6 similarly to the first exemplary embodiment.

An image sharpening unit 18 performs the sharpening for each of the three components of R, G, and B of the original image 1, whereby the Equation (5) behaves like Equation (6).

$$\begin{cases} R'(i, j) = R(i, j) + \lambda(i, j) \times \{R(i, j) - \sum_{k,l} R(i-k, j-l)g(k, l)\} \\ G'(i, j) = G(i, j) + \lambda(i, j) \times \{G(i, j) - \sum_{k,l} G(i-k, j-l)g(k, l)\} \\ B'(i, j) = B(i \cdot j) + \lambda(i, j) \times \{B(i, j) - \sum_{k,l} B(i-k, j-l)g(k, l)\} \end{cases} \quad (6)$$

With the above-mentioned process, a sharpened image 21 is obtained.

Additionally, while it is also possible that the exemplary embodiments of the present invention described above are configured of hardware as apparent from the explanation described above, they can be also realized with a computer program.

Additionally, while one part or an entirety of the above-mentioned exemplary embodiments can be described like the following supplementary notes, they are not limited to the following.

Further, the content of the above-mentioned exemplary embodiments can be expressed as follows.

(Supplementary note 1) An image processing method of detecting an edge from an image to which a sharpening process is to be applied, and based upon a length of said edge existing near a target pixel of the sharpening process, deciding a strength of the sharpening process in said target pixel.

(Supplementary note 2) An image processing method according to Supplementary note 1, comprising:

detecting the edge from the image;

extracting an edge line segment, being a straight line, from said edge; and deciding the strength of the sharpening process in said target pixel based upon a length of the edge line segment existing near the target pixel of the sharpening process.

(Supplementary note 3) An image processing method according to Supplementary note 1 or Supplementary note 2, comprising:

creating a luminance image and a color difference image or a chromaticity image from the image;

creating a sharpened luminance image by applying the sharpening process for said luminance image; and outputting a sharpened color image from said sharpened luminance image and said color difference image or said chromaticity image.

(Supplementary note 4) An image processing method according to one of Supplementary note 1 to Supplementary note 3, comprising applying, when said image is an RGB image, said sharpening process for each image of respective components of said RGB.

(Supplementary note 5) An image processing method according to one of Supplementary note 1 to Supplementary note 4, comprising deciding the strength of the sharpening process based upon a length of the short edge when a plurality of the edges exist adjacently.

(Supplementary note 6) An image processing method according to one of Supplementary note 1 to Supplementary note 5, comprising deciding an application scope of the sharpening process based upon a length of the short edge when a plurality of the edges exist adjacently.

(Supplementary note 7) An image processing device comprising:

an image sharpening strength decision unit that detects an edge from an image to which a sharpening process is to be applied, and based upon a length of said edge existing near a target pixel of the sharpening process, decides a strength of the sharpening process in said target pixel; and a sharpening processing unit that performs sharpening of said image based upon said strength of the sharpening process.

(Supplementary note 8) An image processing device according to Supplementary note 7, wherein said image sharpening strength decision unit comprises:

an edge detection unit that detects the edge from the image;

an edge line segment extraction unit that extracts an edge line segment, being a straight line, from said edge; and an edge strength decision unit that decides said strength of the sharpening process in said target pixel within the image based upon a length of said edge line segment existing adjacently.

(Supplementary note 9) An image processing device according to Supplementary note 7 or Supplementary note 8, comprising an image creation unit that creates a luminance image and a color difference image or a chromaticity image from the image;

wherein said image sharpening strength decision unit decides the strength of the sharpening process based upon said luminance image; and wherein said sharpening processing unit comprises an image conversion unit that:

performs the sharpening process for said luminance image based upon said strength of the sharpening process, and creates a sharpened luminance image; and outputs a sharpened color image from said sharpened luminance image and said color difference image or said chromaticity image.

(Supplementary note 10) An image processing device according to one of Supplementary note 7 to Supplementary note 9, wherein when the image is an RGB image, the image sharpening strength decision unit and the sharpening processing unit are mounted for each image of respective components of said RGB.

(Supplementary note 11) An image processing device according to one of Supplementary note 7 to Supplementary note 10, wherein said image sharpening strength decision unit decides the strength of the sharpening process based upon a length of the short edge when a plurality of the edges exist adjacently.

(Supplementary note 12) An image processing device according to one of Supplementary note 7 to Supplementary note 11, wherein said image sharpening strength decision unit decides an application scope of the sharpening process based upon a length of the short edge when a plurality of the edges exist adjacently.

(Supplementary note 13) A program for causing an information processing device to execute:

an image sharpening strength decision process of detecting an edge from an image to which a sharpening process is to be applied, and based upon a length of said edge existing near a target pixel of the sharpening process, deciding a strength of the sharpening process in said target pixel; and a sharpening process of performing sharpening of said image based upon said strength decided by the image sharpening strength decision process.

(Supplementary note 14) A program according to Supplementary note 13, wherein said image sharpening strength decision process comprises:

an edge detection process of detecting the edge from the image;

an edge line segment extraction process of extracting an edge line segment, being a straight line, from said edge; and an edge strength decision process of deciding said strength of the sharpening process in said target pixel within the image based upon a length of said edge line segment existing adjacently.

(Supplementary note 15) A program according to Supplementary note 13 or Supplementary note 14, causing the information processing device to execute an image creation process of creating a luminance image and a color difference image or a chromaticity image from the image;

wherein said image sharpening strength decision process decides the strength of the sharpening process based upon said luminance image; and wherein said sharpening process executes a process of:

performing the sharpening process for said luminance image based upon said strength of the sharpening process, and creating a sharpened luminance image; and outputting a sharpened color image from said sharpened luminance image and said color difference image or said chromaticity image.

(Supplementary note 16) A program according to one of Supplementary note 13 to Supplementary note 15, said program executing, when the image is an RGB image, the image sharpening strength decision process and the sharpening process for each image of respective components of said RGB.

(Supplementary note 17) A program according to one of Supplementary note 13 to Supplementary note 16, wherein said image sharpening strength decision process decides the strength of the sharpening process based upon a length of the short edge when a plurality of the edges exist adjacently.

(Supplementary note 18) A program according to one of Supplementary note 13 to Supplementary note 17, wherein said image sharpening strength decision process decides an application scope of the sharpening process based upon a length of the short edge when a plurality of the edges exist adjacently.

Above, although the present invention has been particularly described with reference to the preferred embodiments, it should be readily apparent to those of ordinary skill in the art that the present invention is not always limited to the above-mentioned embodiment, and changes and modifications in the form and details may be made without departing from the spirit and scope of the invention.

This application is based upon and claims the benefit of priority from Japanese patent application No. 2009-190248, filed on Aug. 19, 2009, the disclosure of which is incorporated herein in its entirety by reference.

INDUSTRIAL APPLICABILITY

The present invention may be applied to applications for improving the image quality of the image by automatically correcting each part in the image so that it has the optimum sharpness when utilizing the images inputted from digital cameras or scanners for printing/displaying/website.

REFERENCE SIGNS LIST 1 original image
2 image conversion unit
3 luminance image
4 color difference image
5 line segment detection unit
6 sharpening strength map creation unit
7 sharpening strength map image
8 image sharpening unit
9 sharpened luminance image
10 image conversion unit
11 sharpened image
15 line segment detection unit
18 image sharpening unit
21 sharpened image
51 first derivative unit
52 second derivative unit
53 zero-crossing detection unit
54 binarization unit
55 edge image
56 edge tracking unit
57 line segment list

The invention claimed is:

1. An image processing method, comprising:
detecting an edge from an image;
extracting an edge line segment, being a straight line, from the edge; and
deciding a strength of a sharpening process in a target pixel automatically based upon a length of the edge line segment existing near the target pixel of the sharpening process using a processor;
performing sharpening of said image based upon the automatically decided strength of the sharpening process,
wherein the deciding a strength of a sharpening process automatically decides the strength of the sharpening process based upon a length of a shortest edge line segment when a plurality of edge line segments exist adjacently.

2. The image processing method according to claim 1, comprising:
creating a luminance image and a color difference image or a chromaticity image from the image;
creating a sharpened luminance image by applying the sharpening process for said luminance image; and
outputting a sharpened color image from said sharpened luminance image and said color difference image or said chromaticity image.

3. The image processing method according to claim 1, comprising applying, when said image is an RGB (Red, Green, Blue) image, said sharpening process for each image of respective components of said RGB image.

4. The image processing method according to claim 1, comprising deciding an application scope of the sharpening process based upon the length of the shortest edge line segment when the plurality of the edge line segments exist adjacently.

5. An image processing device comprising:
an image sharpening strength decider that detects an edge from an image to which a sharpening process is to be applied, and based upon a length of said edge existing near a target pixel of the sharpening process, decides a strength of the sharpening process in said target pixel; and
a sharpener that performs sharpening of said image based upon said strength of the sharpening process;
wherein said image sharpening strength decider comprises an edge detector that detects the edge from the image;
an edge line segment extractor that extracts an edge line segment, being a straight line, from said edge; and
an edge strength decider that automatically decides said strength of the sharpening process in said target pixel within the image based upon a length of said edge line segment existing adjacently;

wherein said image sharpening strength decider automatically decides the strength of the sharpening process based upon a length of a shortest edge line segment when a plurality of edge line segments exist adjacently.

6. The image processing device according to claim 5, comprising an image creator that creates a luminance image and a color difference image or a chromaticity image from the image;
   wherein said image sharpening strength decider decides the strength of the sharpening process based upon said luminance image; and
   wherein said sharpener comprises an image convertor that:
   performs the sharpening process for said luminance image based upon said strength of the sharpening process, and creates a sharpened luminance image; and
   outputs a sharpened color image from said sharpened luminance image and said color difference image or said chromaticity image.

7. The image processing device according to claim 5, wherein when the image is an RGB (Red, Green, Blue) image, the image sharpening strength decider and the sharpener are mounted for each image of respective components of said RGB image.

8. The image processing device according to claim 5, wherein said image sharpening strength decider decides an application scope of the sharpening process based upon the length of the shortest edge line segment when the plurality of the edge line segments exist adjacently.

9. A non-transitory computer readable storage medium storing a program for causing an information processing device to execute:
   an image sharpening strength decision process of detecting an edge from an image to which a sharpening process is to be applied, and based upon a length of said edge existing near a target pixel of the sharpening process, deciding a strength of the sharpening process in said target pixel; and
   a sharpening process of performing sharpening of said image based upon said strength decided by the image sharpening strength decision process;
   wherein said image sharpening strength decision process comprises:
      an edge detection process of detecting the edge from the image;
      an edge line segment extraction process of extracting an edge line segment, being a straight line, from said edge; and
      an edge strength decision process of automatically deciding said strength of the sharpening process in said target pixel within the image based upon a length of said edge line segment existing adjacently;
      wherein said image sharpening strength decision process automatically decides the strength of the sharpening process based upon a length of a shortest edge line segment when a plurality of edge line segments exist adjacently.

10. The non-transitory computer readable storage medium storing the program according to claim 9, causing the information processing device to execute an image creation process of creating a luminance image and a color difference image or a chromaticity image from the image;
    wherein said image sharpening strength decision process decides the strength of the sharpening process based upon said luminance image; and
    wherein said sharpening process executes a process of:
       performing the sharpening process for said luminance image based upon said strength of the sharpening process, and creating a sharpened luminance image; and
       outputting a sharpened color image from said sharpened luminance image and said color difference image or said chromaticity image.

11. The non-transitory computer readable storage medium storing the program according to claim 9, said program executing, when the image is an RGB (Red, Green, Blue) image, the image sharpening strength decision process and the sharpening process for each image of respective components of said RGB image.

12. The non-transitory computer readable storage medium storing the program according to claim 9, wherein said image sharpening strength decision process decides an application scope of the sharpening process based upon the length of the shortest edge line segment when the plurality of the edge line segments exist adjacently.

* * * * *